United States Patent
Endo et al.

(12)

(10) Patent No.: US 6,474,156 B1
(45) Date of Patent: Nov. 5, 2002

(54) METHOD AND DEVICE FOR DETERMINING THE AMOUNT OF A LIQUID EXISTING IN A CONTAINER

(75) Inventors: Takanori Endo; Tadashi Yonezawa; Masami Miyake, all of Saitama; Seiro Yahata, Tokyo; Shigeru Yashima, Miyagi; Shigenobu Irokawa, Miyagi; Sumio Suzuki, Miyagi; Hideaki Matsuda, Miyagi, all of (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 09/311,359

(22) Filed: May 13, 1999

(30) Foreign Application Priority Data

Oct. 19, 1988 (JP) .............................. 10-296533
May 13, 1998 (JP) .............................. 10-129813
May 11, 1999 (JP) .............................. 11-129366

(51) Int. Cl.$^7$ .......................... G02F 23/26; D06F 39/08
(52) U.S. Cl. .................... 73/290 V; 73/304 C; 340/618
(58) Field of Search ........................... 73/290 V, 290 R, 73/304 C; 340/618, 620, 621; 101/484, 494, DIG. 45

(56) References Cited

U.S. PATENT DOCUMENTS 4,415,886 A * 11/1983 Kyogoku et al. ........... 340/618
5,602,540 A * 2/1997 Spillman, Jr. .......... 340/870.37
5,682,184 A * 10/1997 Stephany et al. ............... 347/7
5,735,167 A * 4/1998 Puukangas et al. ....... 73/304 C

FOREIGN PATENT DOCUMENTS

| JP | 53-131068 | 11/1978 |
|---|---|---|
| JP | 62-146632 | 6/1987 |
| JP | 3-28342 | 6/1991 |
| JP | 5-184777 A * | 7/1993 |
| JP | 5-229243 | 9/1993 |
| JP | 6-56180 | 3/1994 |
| JP | 6-155885 | 6/1994 |
| JP | 8-216371 | 8/1996 |
| JP | 10-76674 | 3/1998 |
| JP | 10-337944 | 12/1998 |
| JP | 11-101680 | 4/1999 |

* cited by examiner

Primary Examiner—Hezron Williams
Assistant Examiner—Michael Cygan
(74) Attorney, Agent, or Firm—Oblon, Spivak, McClelland, Maier & Neustadt, P.C.

(57) ABSTRACT

A method and a device for determining the amount of ink or similar liquid existing in a container are disclosed. A resonance circuit is arranged on the container storing the liquid. A voltage having a preselected frequency is applied to a drive coil located outside of the container to thereby induce a voltage having a preselected frequency in the resonance circuit. The voltage induced in the resonance circuit, in turn, induces a voltage having a preselected frequency in a sense coil also located outside of the container. The amount of liquid in the container is determined in terms of the voltage induced in the sense coil.

20 Claims, 12 Drawing Sheets

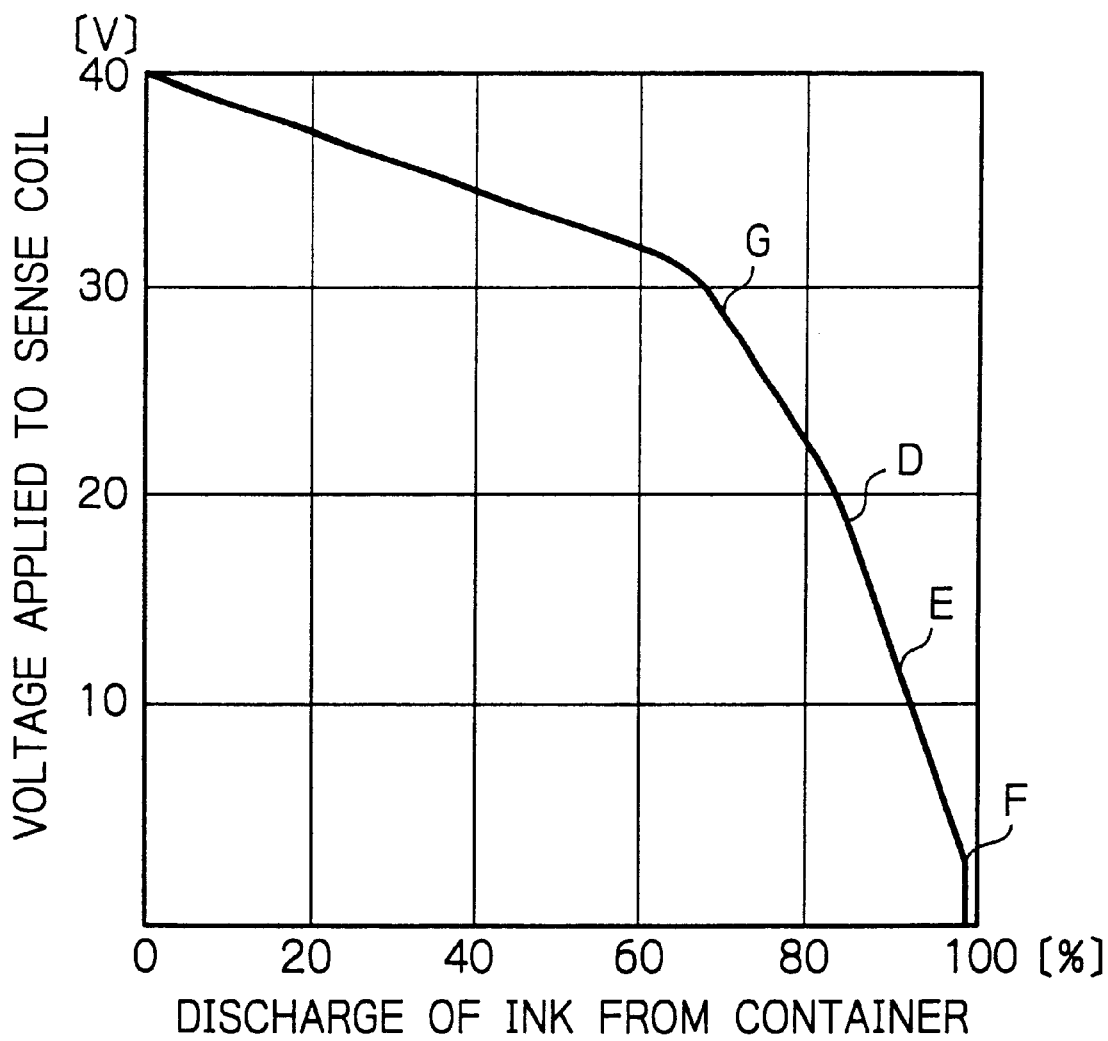

METHOD AND DEVICE FOR DETERMINING THE AMOUNT OF A LIQUID EXISTING IN A CONTAINER

BACKGROUND OF THE INVENTION

The present invention relates to a method and a device for determining the amount of a liquid, e.g., ink for use in a printer existing in a container.

A printer, for example, includes an ink storing section storing ink for printing images. Japanese Patent Laid-Open Publication No. 8-216371, for example, discloses a device for determining the amount of ink remaining in the ink storing section. In the device disclosed in this document, the ink storing section is partly or entirely implemented as bellows or similar compressible member. A sensor is provided for sensing the position of the ink storing section and implemented by, e.g., a position sensor responsive to the position of the end of the compressible ink storing section. A pressing section is located outside of the ink storing section for pressing its end and thereby compressing the ink.

The above prior art device provides the ink storing section with a hermetic integral configuration in order to prevent the ink from drying and to promote easy refilling of the ink storing section. However, the pressing section for pressing the ink storing section has a complicated structure and needs an exclusive space therefor.

Japanese Patent Laid-Open Publication No. 10-76674, for example, teaches an ink sensing device as a solution to the above problem The ink sensing device includes a pulse signal generating section for generating a pulse signal, A differentiating circuit differentiates the pulse signal and feeds the resulting voltage signal to electrodes disposed in an ink storing section. A gate passes only the positive voltage of the voltage signal applied to the electrodes on the basis of the pulse signal output from the pulse signal generating section An ink level sensing section determine, based on the output of the gate, whether or not the ink level in the in storing section is above a preselected level. The differentiating circuit is constituted by a capacitor, a resistor and the above electrodes. The ink level sensing section is made up of a peak hold circuit and a comparator for comparing the output of the peak hold circuit and a preselected voltage.

So long as a sufficient amount of ink is available in the ink storing section, positive and negative voltages appear at the junction between the electrode and the gate when the ink storing section runs out of ink, the impedance between the electrodes varies with the result that only positive voltages lower than the peak value of the above voltages appears at the junction. On the other hand, the gate opens only when the pulse signal output from the pulse generating section is positive, so that only positive voltages are applied to the peak hold circuit. Consequently, the peak hold circuit can be driven only by a positive power source and does not need a negative power source. The comparator compares peaks held by the peak hold circuit with the preselected voltage while sending the results of comparison to a CPU (Central Processing Unit).

A problem with the above ink sensing device is that the ink contacting the electrodes deposits on the electrodes and degrades the sensing ability of the device and causes the electrodes to corrode. Another problem is that the electrodes are sealed in a cartridge formed of vinyl chloride or similar resin together with the ink and must therefore be led out to the outside of the cartridge. This makes it difficult to hermetically seal the cartridge and thereby renders the structure sophisticated. Further, electric contacts expected to contact such electrodes must be provided on the printer side, further sophisticating the structure.

Technologies relating to the present invention are also disclosed in, e.g., Japanese Utility Model Publication No. 3-28 342 and Japanese Patent Laid-Open Publication Nos. 53-131 068, 82-146632, 5-229 243, 8-56 180, 6-155 885, 10-337 944, and 11-101 680.

SUMMARY OF THE INVENTION

It is therefore an object of the present invention to provide a method and a device capable of surely detecting the decrease of a liquid stored in a container below a preselected amount with a simple and space-saving structure and without causing electrodes to corrode.

It is another object of the present invention to provide a device for determining the amount of a liquid existing in a container and capable of producing an alarm when the liquid decreases below a preselected amount or automatically stopping the operation of an apparatus using the liquid when the container is about to run out of the liquid.

A method of determining the amount of a liquid existing in a container of the present invention has the steps of arranging a resonance circuit on the container storing the liquid, applying a voltage having a preselected frequency to a drive coil located outside of the container to thereby induce a voltage having a preselected frequency in the resonance circuit, inducing, based on the voltage induced in the resonance circuit, a voltage having a preselected frequency in a sense coil located outside of the container, and measuring the voltage induced in the sense coil.

Also, a device for determining the amount of a liquid existing in a container of the present invention includes a resonance circuit arranged on the container storing the liquid, and a drive coil and a sense coil located outside of the container. The resonance circuit includes a pair of electrodes arranged on one or both of the side and bottom of the container, a first coil connected to one of the electrodes and facing the drive coil, and a second coil connected to the other electrode and facing the sense coil.

BRIEF DESCRIPTION OF THE DRAWINGS

The above and other objects, features and advantages of the present invention will become more apparent from the following detailed description taken with the accompanying drawings in which:

FIG. 19 is a graph showing a relation between the amount of ink discharged from tho container and the voltage acting on the sense coil and particular to Example 4.

DESCRIPTION OF THE PREFERRED EMBODIMENTS

Figure 1:
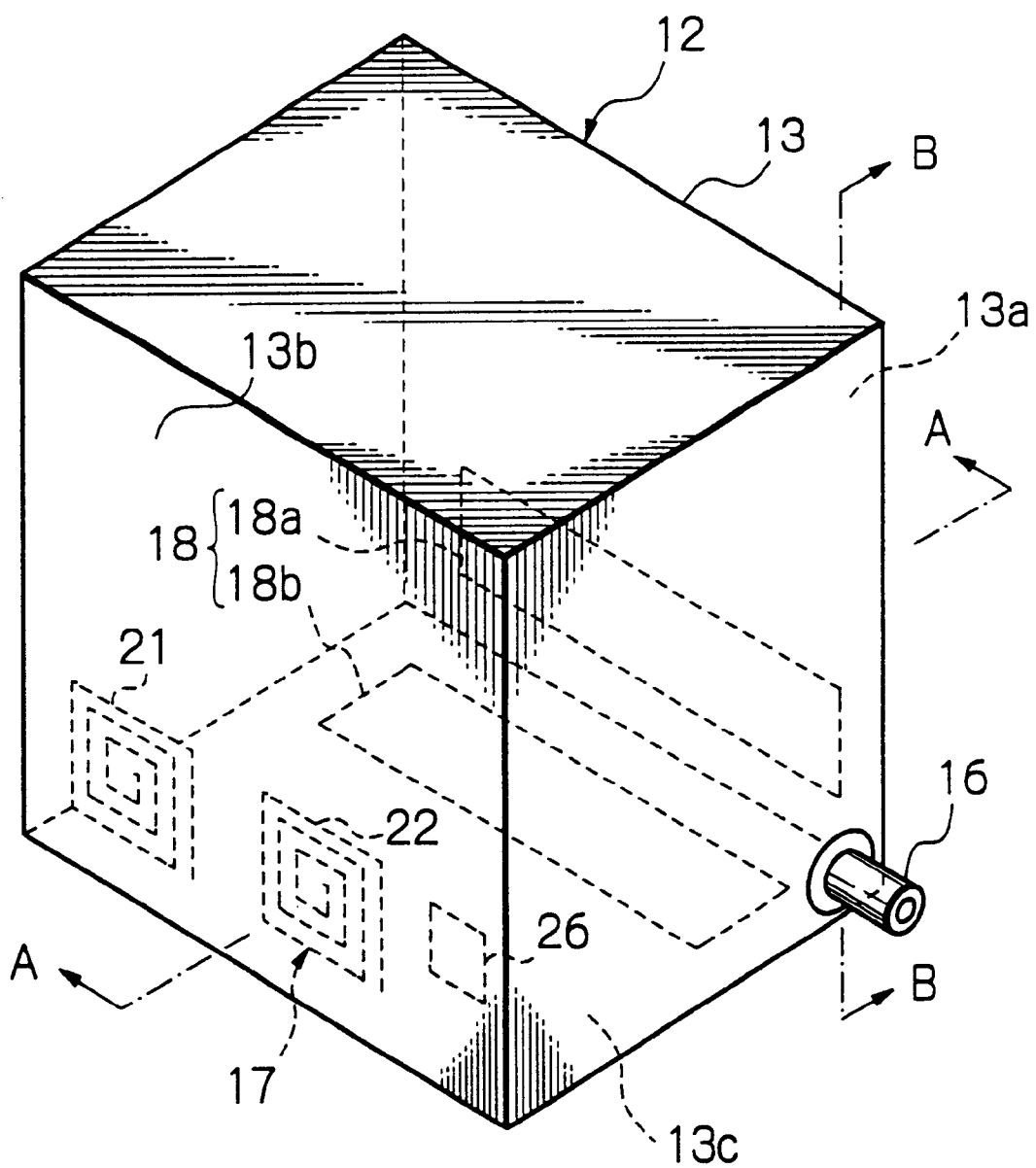
FIG. 1 is a perspective view of a container included in a first embodiment of the present invention and showing a positional relation between the structural elements of a resonance circuit.

Preferred embodiments of the method and device in accordance with the present invention will be described hereinafter. The illustrative embodiments to be described are applied to a printer by way of example, Referring to FIG. 5 of the drawings, a printer 10 to which a first embodiment of the present invention is applied is capable of making a master out of a stencil and printing images therewith alone. As shown, the printer 10 includes a document feeder 10a. When the operator of the printer sets a document 10b on the document feeder 10a and then presses a switch, not shown, a thermal head, not shown, perforates a stencil, not shown, by heat to thereby form the image of the document 10b in the stencil. The perforated stencil, or master, is wrapped around a print drum 10c. Subsequently, when the operator presses another switch, not shown, ink 11 (see FIGS. 3 and 4) is fed to the master from the inside of the drum 10c. As a result, the image of the document 10b is transferred to a paper or similar recording medium 10d via the master.

Figure 3:
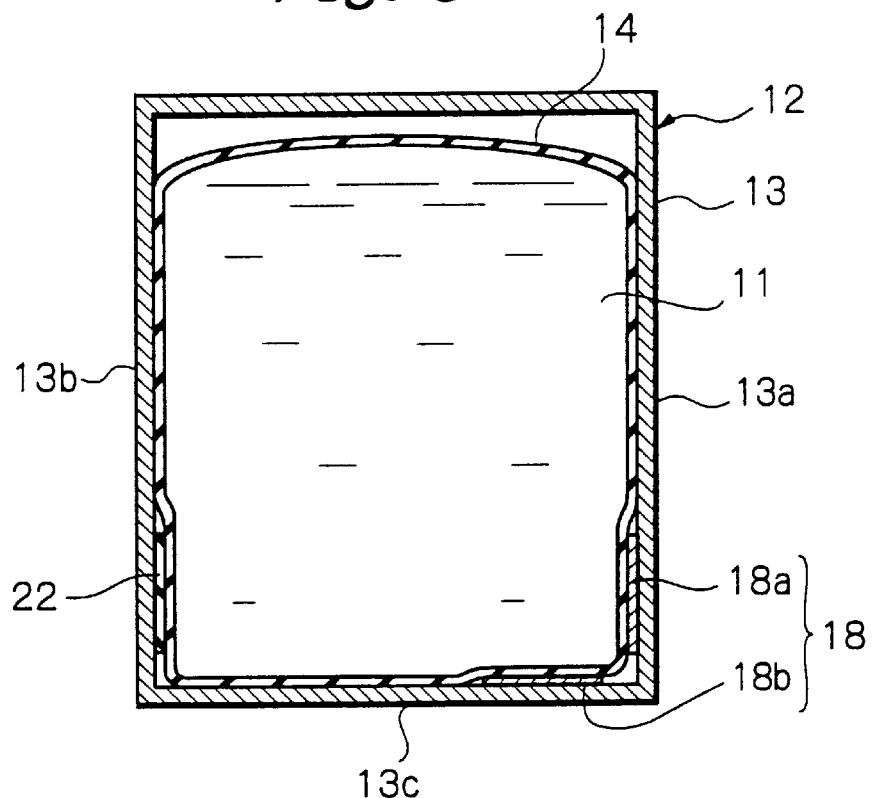
FIGS. 3 and 4 are sections along lines A—A and B—B of FIG. 1, respectively.
Figure 4:
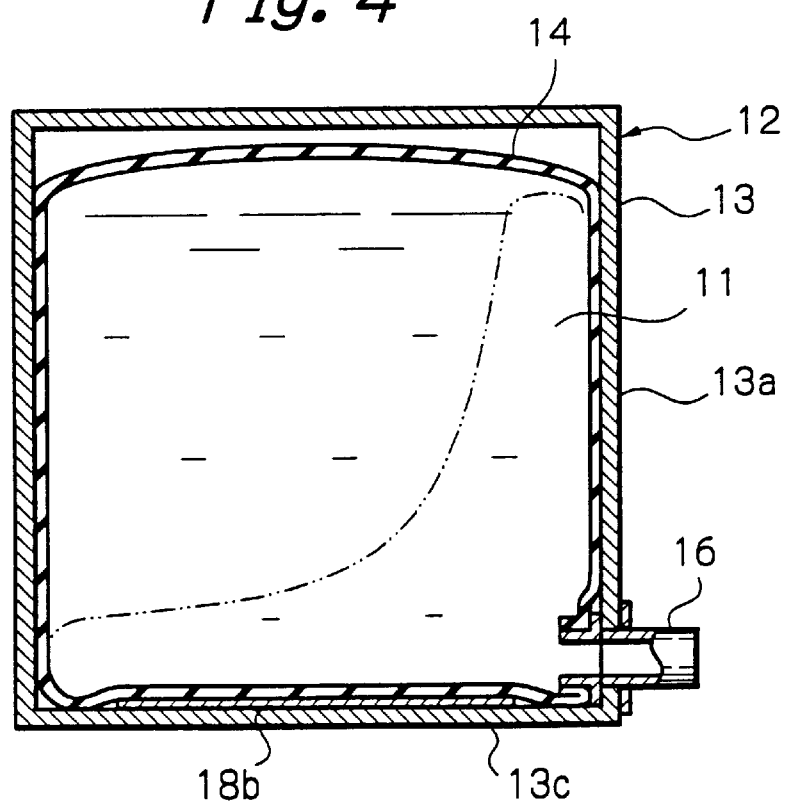
Figure 5:
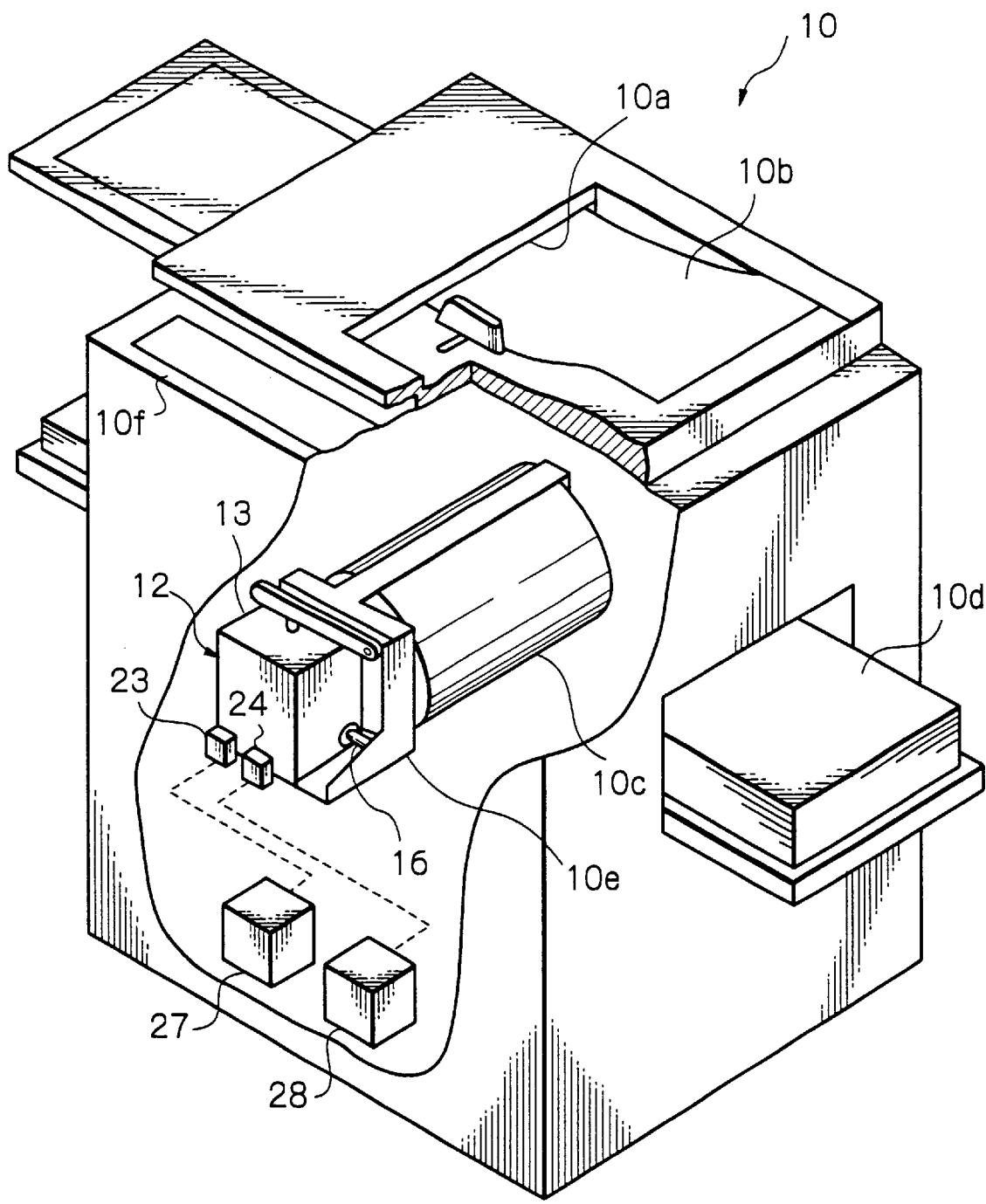
FIG. 5 is a perspective view showing a printer including the container of FIG. 1.

As shown in FIGS. 3 and 4, the ink 11 is stored in a container 12 formed of an insulating material. As shown in FIG. 5, the container 12 is mounted to a bracket 10e. which supports the print drum 10c. The container 12 is made up of a rectangular parallelepiped box 13 (see FIGS. 1 and 3–5) and a sack 14 (see FIGS. 3 and 4) storing the ink 11. The box 13 and sack 14 are formed of cardboard and vinyl chloride, respectively. A nozzle 16 extends out from the lower portion of the side of the box 14 and is connected to the sack 14 at its one end, as shown in FIGS. 1, 4 and 5. When the ink 11 in the sack 14 decreases, the sack 14 deflates, as indicated by a dash-and-dots line in FIG. 4.

Figure 2:
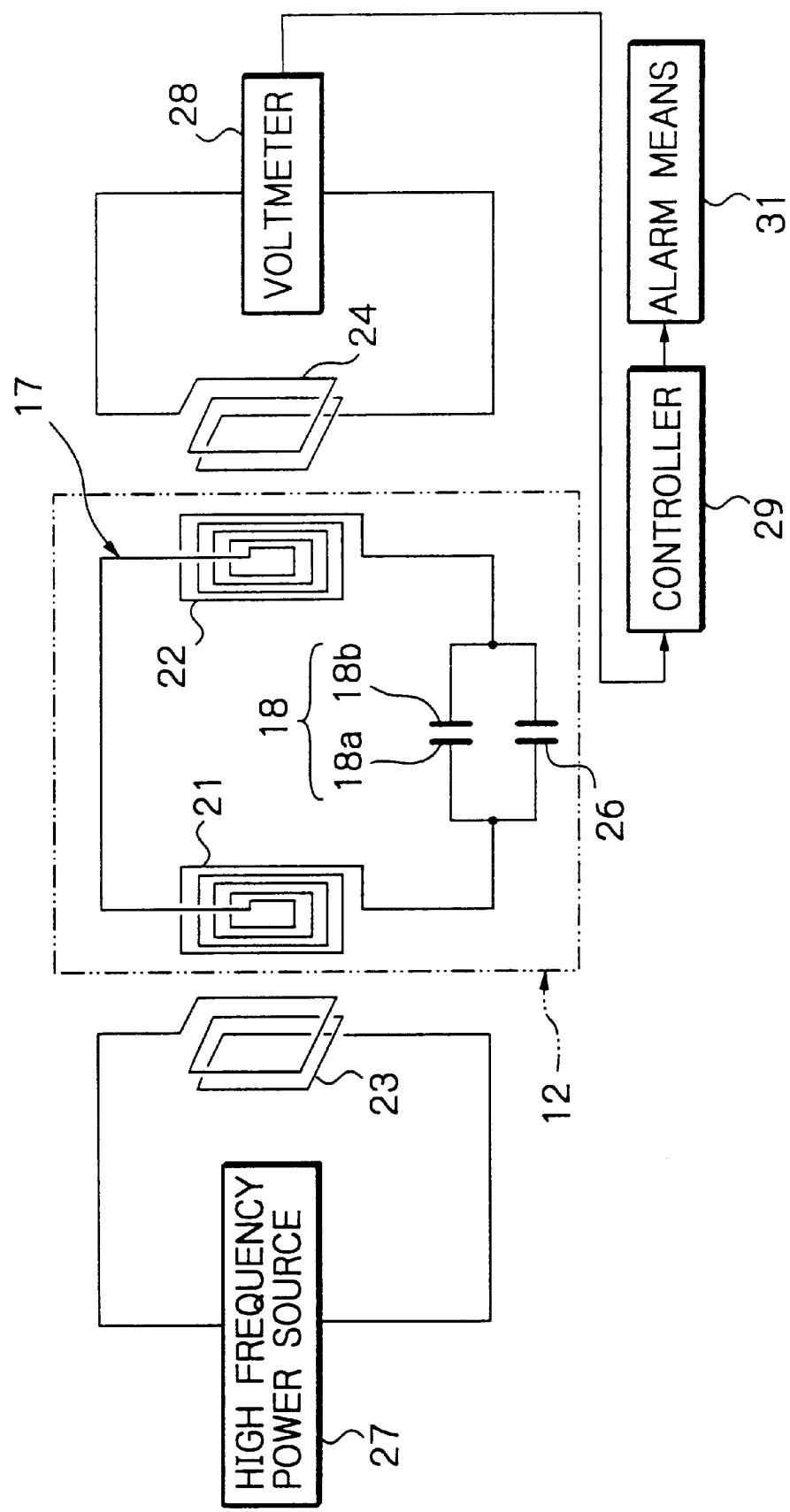
FIG. 2 is a block diagram schematically showing circuitry including the resonance circuit.

As shown in FIGS. 1 and 2, a resonance circuit 17 is arranged on the box 13. The resonance circuit 17 is made up of a pair of electrodes 18a and 18b (collectively 18), a first coil 21, and a second coil 22. The two electrodes 18a and 18b are respectively provided on the side and bottom of the box 13. The first and second coils 21 and 22 are connected to the electrodes 18a and 18b, respectively, More specifically, the electrode 18a is positioned on the inner lower portion of one side wall 13a of the box 13. The other electrode 18b is positioned on the upper surface of the bottom wall 13c of the box 13 in the vicinity of the above side wall 13a, as shown in FIG. 1.

The electrodes 18a and 18b and ink 11 stored in the container 12 constitute a capacitor having a capacitance C. The resonance circuit has a Q value, i.e., a value representative of the small resistance loss of a coil or that of a capacitor in a high frequency circuit. The capacitance C and Q value vary in accordance with the amount of the ink 11 remaining in the container 12.

The first coil 21 is arranged an the inner surface of a side is wall 13b opposite to the side wall 13a and faces a drive or excitation coil 23 (see FIGS. 2 and 5) positioned outside of the box 13. Likewise, the second coil 22 is arranged on the inner surface of the side wall 13b and faces a sense coil 24 (see FIGS. 2 and 5) also located outside of the box 13. The first and second coils 21 and 22 each have a rectangular or circular spiral configuration having three turns to twenty turns, preferably five turns to 10 turns. This is also true with the drive coil 23 and sense coil 24.

The electrodes 18a and 18b are electrically connected to one and of the coil 21 and one end of the coil 22, respectively. The other end of the coil 21 is electrically connected to the other end of the coil 22, as shown in FIG. 2. A low breakdown voltage capacitor 26 is electrically connected in parallel to the electrodes 18a and 12b and breaks down when a voltage above a preselected value is applied thereto. Specifically, the capacitor 28 breaks down at a voltage ranging from 5 V to 80 V, preferably from 20 V to 60 V. The electrodes 18a and 18b, coils 21 and 22, capacitor 26 and wirings electrically connecting them should preferably be formed by the etching of foil of aluminum, copper or similar metal from the space requirement, mass productivity and production cost standpoint.

A high frequency power source 27 is electrically connected to the drive coil 23 and outputs a voltage of preselected frequency. As shown in FIG, 2, alarm means 31 is electrically connected to the sense coil 24 via a voltmeter 28 and a controller 29. The voltage output from the above power source 27 has such a frequency that a voltage induced in the sense coil 24 is higher when the container 12 is full of ink 11 than when it runs out of ink 11, and has a greater difference in the former condition than in the latter condition. In addition, the frequency of power source voltage is close to a frequency at which the resonance circuit 17 resonates when the container 12 is about to run out of ink 11. Further, the above frequency is selected such that the voltages to act on the electrodes 18 and capacitor 26 are higher when the container 12 is about to run out of ink 11 than when it is full of ink 11 and has a greater difference in the former condition than in the latter condition.

The voltmeter 28 senses a voltage induced in the sense coil 24. The alarm means 31 is implemented by one or both of a buzzer and a lamp. Specifically, as shown in FIG. 2, the output of the voltmeter 28 is applied to the control input of the controller 29. The control output of the controller 29 is input to the alarm means 31. In this configuration, the controller 29 controls the alarm means 31 in response to the output of the voltmeter 28. More specifically, when the voltage sensed by the sense coal 24 decreases below a preselected value, the controller 29 drives the alarm means 31. When the voltage sensed by the sense coil 24 further decreases due to the breakdown of the capacitor 26, the controller 29 causes the entire printer 10 to stop operating. If desired, the lamp playing the role of the alarm means 31 may be replaced with a character display or similar display, not shown, mounted on an operation panel 10f (see FIG. 5)

How the illustrative embodiment determines the amount of the ink 11 existing in the container 12 will be described hereinafter. The voltage output from the high frequency power source 27 and having the preselected frequency is applied to the drive coil 23 and induced in the coil 21. As a result, a high frequency current flows through the resonance circuit 17 and applies a voltage of preselected frequency to the coil 22. This voltage applied to the coil 22 is induced in the sense coil 24. The voltmeter 28 measures the voltage of preselected frequency induced in the sense coil 24 while sending its output to the controller 29. So long as the amount of the ink 11 in the container 12 is greater than a preselected value during the operation of the printer 10, a voltage induced in the sense coil 24 remains above a preselected value. The controller 29 therefore does not drive the alarm means 31.

When the ink 11 in the container 12 decreases below the preselected amount, i.e., when the voltage induced in the sense coil 24 drops below the preselected value, the controller 29 drives the alarm means 31 in response to the resulting output of the voltmeter 28. The alarm means 31 shows the operator that the ink 11 remaining in the container 12 is short, and allows the operator to prepare for the replacement of the container 12.

Why the voltage induced in the sense coil 24 drops below the preselected value with the decrease in the amount of the ink 11 is as follows. When the ink 11 in the container 12 decreases below the preselected amount, the electric line of force between the electrodes 18a and 18b extends not through the ink 11 but through air. As a result, the capacitance of the electrodes 18a and 18b decreases and causes the resonance frequency of the resonance circuit 17 to shift to the high frequency side (see FIGS. 14 and 15).

Assume that the printer 10 is continuously operated despite the drive of the alarm means 31. Then, when the container 12 is about to run out of the ink 11, the capacitor 26 breaks down with the result that the voltage induced in the sense coil 24 drops to a preselected value even lower than the above value causing the controller 29 to drive the alarm means 31. In response, the controller 29 causes the printer 10 to stop operating. This successfully obviates defective printings, e.g., printings with blurred characters. Why the capacitor 26 breaks down when the container 12 is about to run out of the ink 11 is that the frequency of the power source voltage is close to the frequency at which the resonance circuit 17 resonates, as stated earlier, and a voltage higher than the breakdown voltage of the capacitor 26 acts on the capacitor 28.

Figure 6:
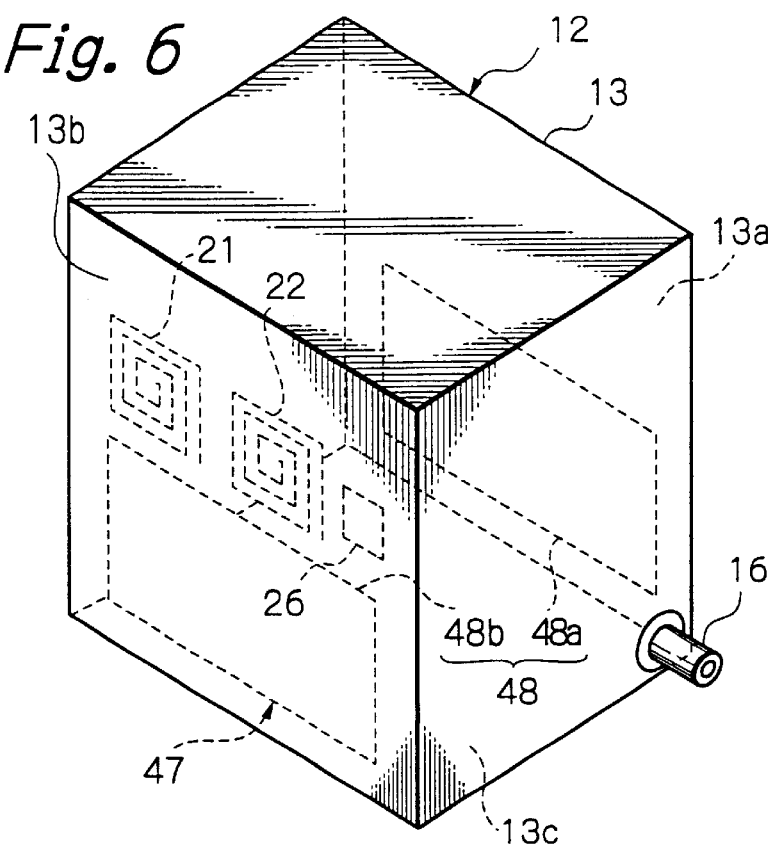
FIG. 6 is a perspective view of a container included in a second embodiment of the present invention.

Reference will be made to FIG. 6 for describing a second embodiment of the present invention. In FIG. 6, structural elements identical with the structural elements shown in FIG. 1 are designated by identical reference numerals and will not be describe specifically in order to avoid redundancy. As shown, this embodiment differs from the previous embodiment in that a pair of electrodes 48 are respectively arranged on the inner lower portions of side walls 13a and 13b of the box 13, and in that the first and second coils 21 and 22 and capacitor 26 are arranged on the inner upper portion of the side wall 12b.

For a given capacitance, the configuration of FIG. 6 needs a greater electrode area than the configuration of FIG. 1. However, the former is more desirable than the latter in that it reduces the error of the capacitance ascribable to the dimensional errors of the electrodes and the angular errors of the container and thereby insures a stable characteristic.

Figure 7:
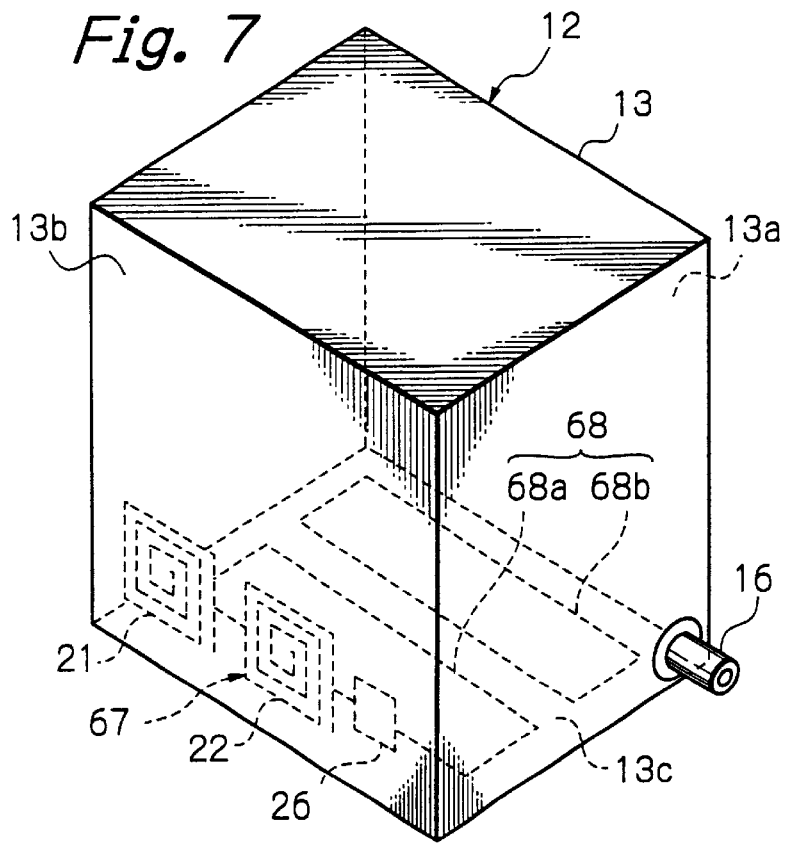
FIG. 7 is a perspective view of a container included in a third embodiment of the present invention.

FIG. 7 shows a third embodiment of the present invention. In FIG. 7, structural elements identical with the structural elements shown in FIG. 1 are designated by identical reference numerals and will not be described in order to avoid redundancy. As shown, this embodiment is identical with the first embodiment except that a resonance circuit 67 has a pair of parallel electrodes 68a and 68b Collectives 68) arranged on the upper surface of the bottom wall 13c of the box 13 at a preselected distance from each other. For a given capacitance, this embodiment needs an electrode area intermediate between the electrode areas of the first and second embodiments and has the previously mentioned capacitance error also intermediate between the errors of the first and second embodiments.

Figure 8:
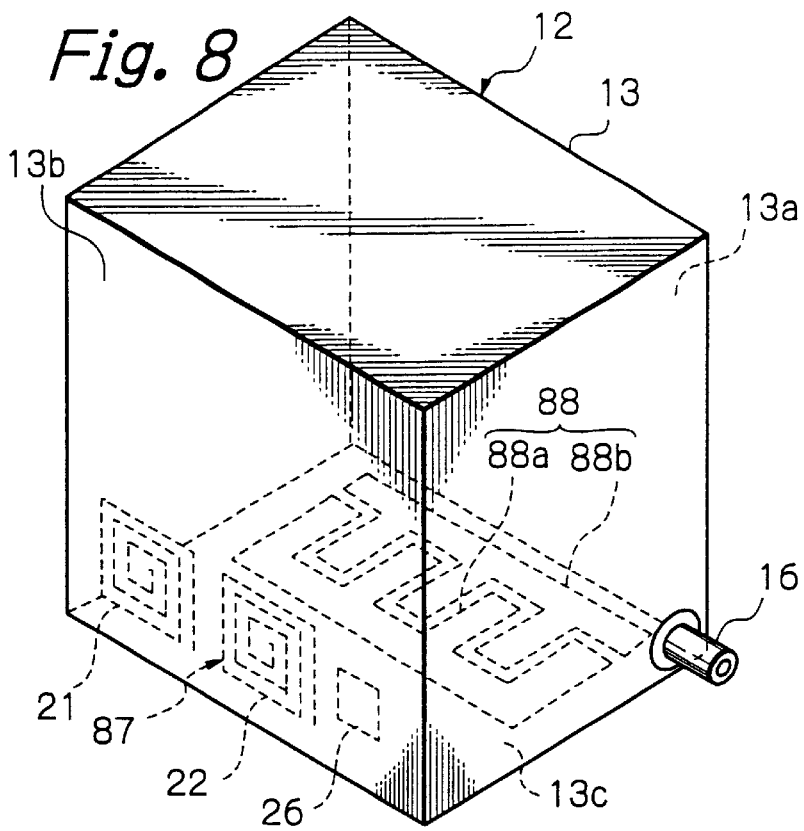
FIG. 8 is a perspective view of a container included in a fourth embodiment of the present invention.

FIG. 8 shows a fourth embodiment of the present invention. In FIG. 8, structural elements identical with the structural elements shown in FIG. 1 are designated by identical reference numerals and will not be described in order to avoid redundancy. As shown, this embodiment is identical with the first embodiment except that a resonance circuit 87 includes a pair of electrodes 68 having fingers alternating with each other and spaced from each other by a preselected distance. For a given capacitance, this embodiment is practicable with a smaller electrode area than the first to third embodiments. The prerequisite with the fourth embodiment is that the box 13 be subjected to moisture-proof treatment in order to insure a stable characteristic, because the capacitance is susceptible to the moisture of the box 13.

Figure 12:
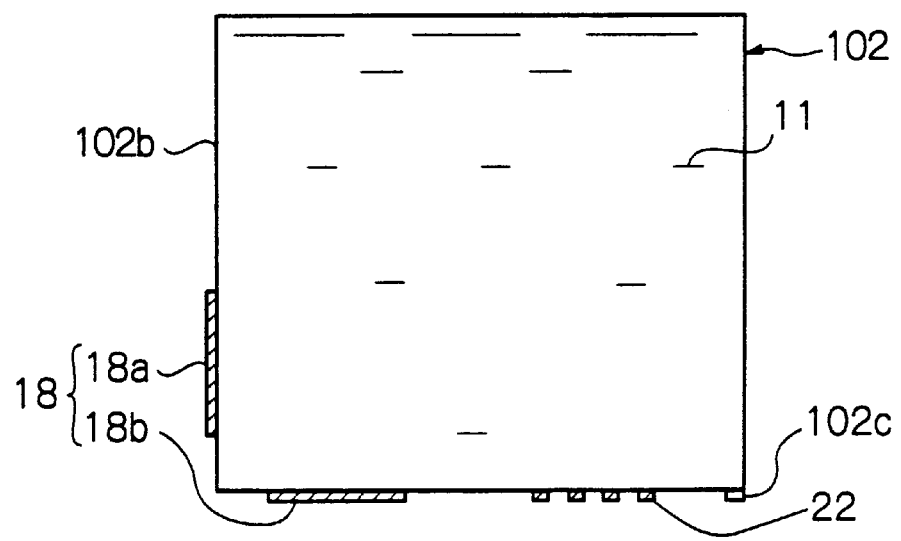
FIG. 12 is a section along line C—C of FIG. 9.
Figure 13:
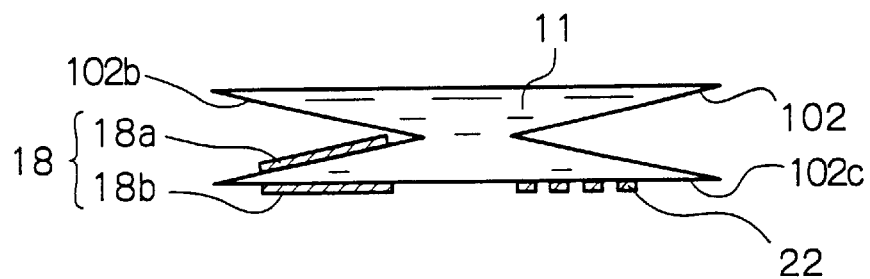
FIG. 13 is a section along line D—D of FIG. 11.

A fifth embodiment of the present invention will be described with reference to FIGS. 9–13. In FIGS. 9–13, structural elements identical with the structural elements shown in FIG. 1 are designated by identical reference numerals and will not be described in order to avoid redundancy. As shown, a container 102 is implemented only by a flexible sack formed of an insulating material and preferably foldable (see FIGS. 9 and 11–13). Specifically, the container 102 is produced by molding a single polyethylene or polyester film or a laminate polyethylene and polyester film in the form of a sack or by adhering or welding the edges of such a film. The container 102 stores the ink 11, as shown in FIGS. 12 and 13.

As shown in FIGS. 9 and 11–13, one electrode 18a is arranged on the outer lower portion of the side wall 102b of the container 102. The other electrode 18b is arranged on the lower surface of the bottom 702c of the container 102 in the vicinity of the side wall 102b. The electrodes 18a and 18b and ink 11 constitute a capacitor. The capacitance of the capacitor and the Q value of a resonance circuit 107 vary as the amount of the ink 11 in the container 102 varies and as the distance between the electrodes 18a and 18b gradually decreases (see FIG. 13).

Figure 9:
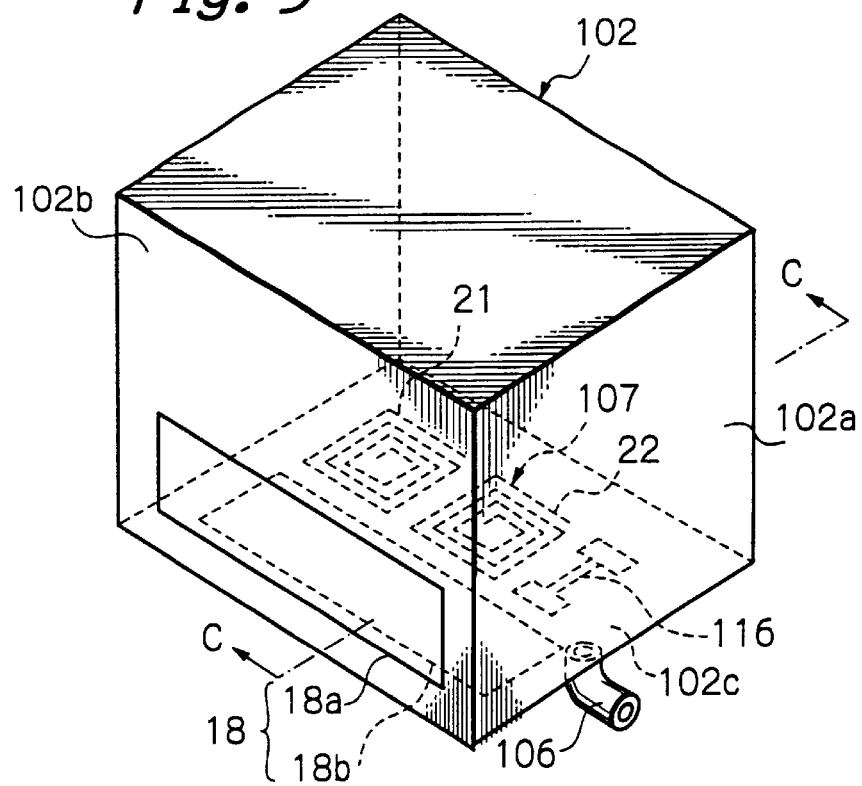
FIG. 9 is a perspective view showing a container included in a fifth embodiment of the present invention.

As shown in FIGS. 9, 12 and 13, the first and second coils 21 and 22 are arranged on the lower surface of the bottom of the side wall 102c. The drive coil 23 and sense coil 24 are therefore positioned below the container 102 and face the coils 21 and 22, respectively.

In the illustrative embodiment, a fuse 116 is substituted for the low breakdown voltage capacitor 26 of the first embodiment and mounted on the lower surface of the bottom wall 102c, as shown in FIGS, 9 and 10, The fuse 116 is serially connected to the electrodes 18a and 18b and blows out when a current of, e. g. 10 mA to 10 A, preferably 100 mA to 1 A, flows therethrough. For this purpose, the fuse 116 should preferably be formed by thinning aluminum foil by etching.

Figure 10:
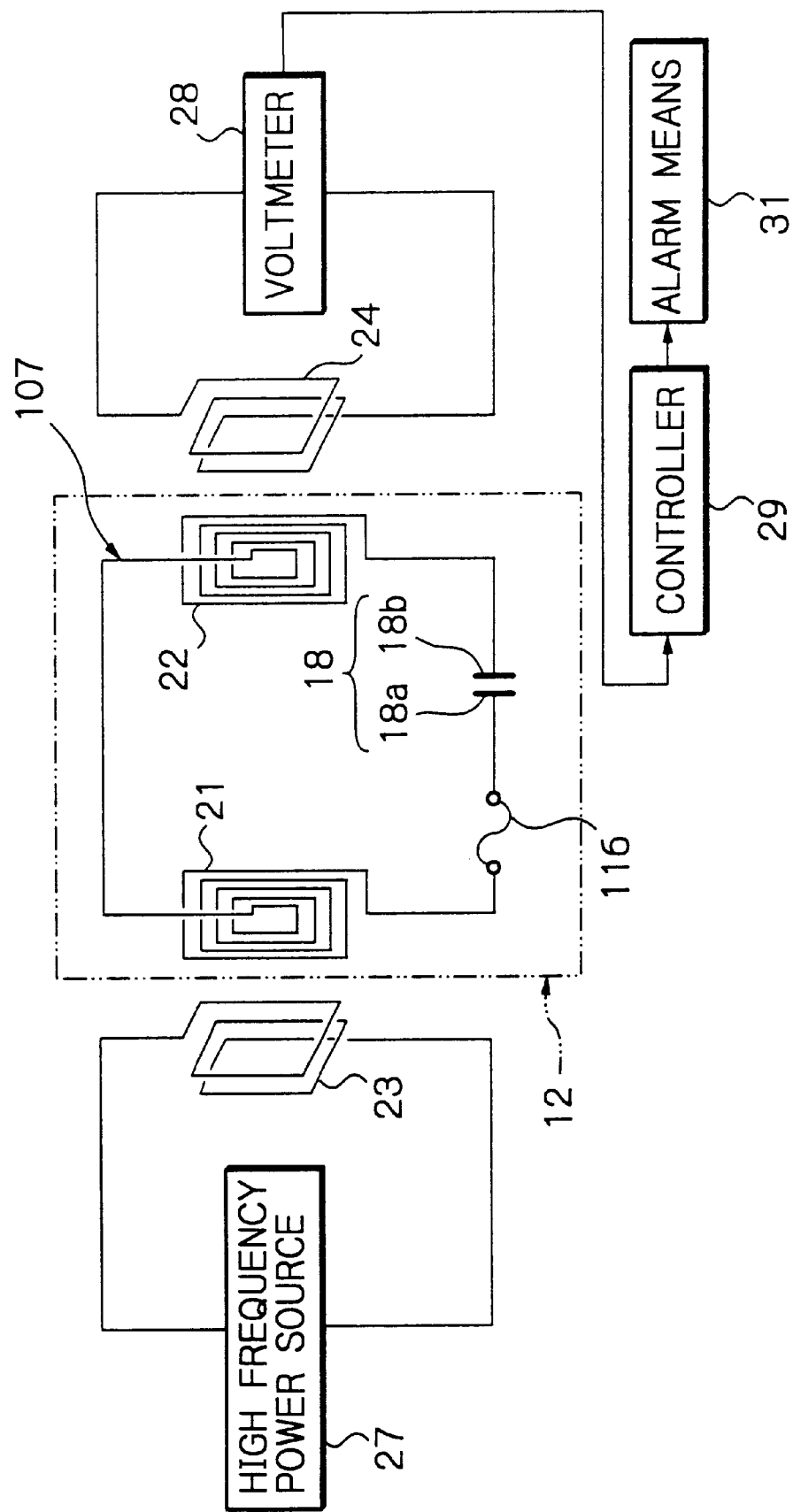
FIG. 10 is a block diagram including a resonance circuit included in the fifth embodiment.

The electrodes 18a and 18b and coils 21 and 22 are electrically connected in the same configuration as in the first embodiment, as shown in FIG. 10. The electrodes 18a and 18b, coils 21 and 22 and fuse 116 should preferably have their surfaces covered with sheets formed of polyethylene terephthalate (PET) or similar insulating material.

The voltage output from the high frequency power source 27 has a frequency selected such that the voltage induced in the sense coil 24 is higher when the container 102 is full of ink 11 than when It runs out of ink 11, and has a greater difference in the former condition than in the latter condition. In addition, the above frequency is close to a frequency at which the resonance circuit 107 resonates when the container 102 is about to run out of ink 11. Further, the frequency of the power source voltage is selected such that the voltage to act between the electrodes 18a and 18b is higher when the container 102 is about to run out of ink 11 than when it is full of ink 11, and has a greater difference in the former condition than in the latter condition.

Figure 11:
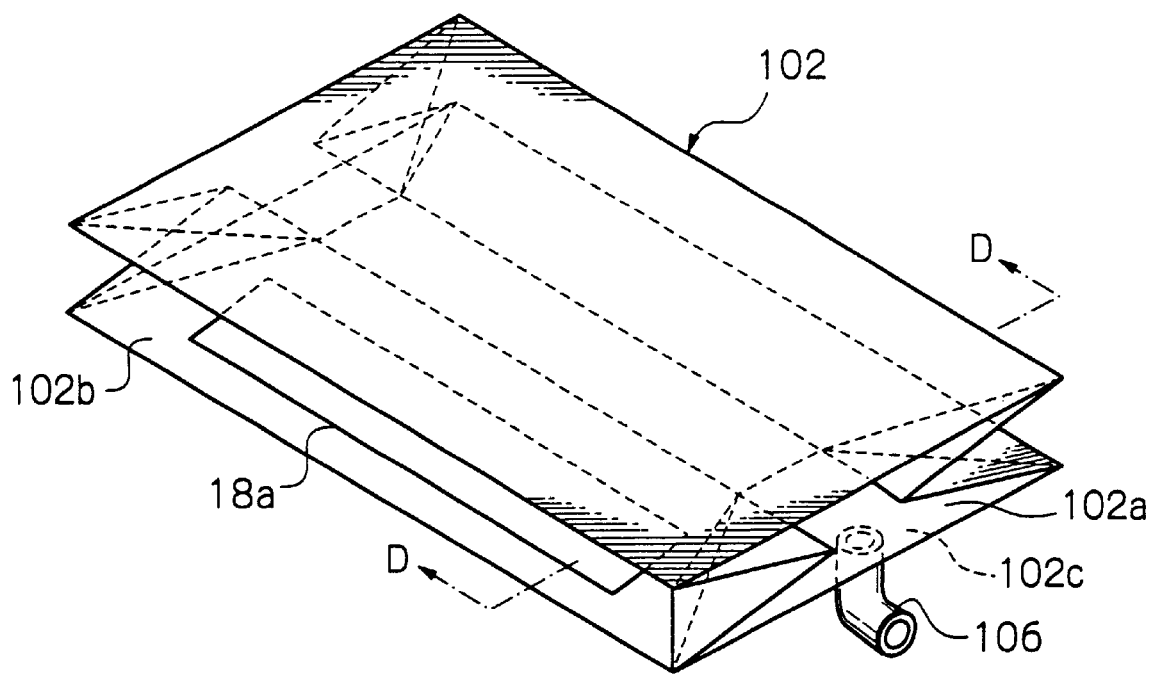
FIG. 11 is a perspective view showing the container of the fifth embodiment in which little ink is left.

A nozzle 106 shown in FIGS. 9 and 11 should preferably be mounted on the bottom wall 102c of the container 102. Should the nozzle 108 be mounted on the side wall 102a of the container 102, the side wall 102a gradually deforming due to the consumption of the ink 11 would vary the orientation of the nozzle 106.

How the illustrative embodiment determines the amount of ink 11 remaining in the container 12 will be described hereinafter. The voltage output from the high frequency power source 27 and having the preselected frequency is applied to the drive coil 23 and induced in the coil 21. As a result, a high frequency current flows through the resonance circuit 107 and applies a voltage of preselected frequency to the coil 22. This voltage applied to tho coil 22 is induced in the sense coil 24. The voltmeter 28 measures the voltage of preselected frequency induced in the sense coil 24 while sending its output to the controller 29. So long as the amount of the ink 11 in the container 102 is greater than a preselected value during the operation of the printer, a voltage induced in the sense coil 24 remains higher than a preselected value. The controller 29 therefore does not drive the alarm means 31.

When the ink 11 in the container 102 decreases below the preselected amount, i.e. , when the voltage induced in the sense coil 24 drops below the preselected value, the controller 29 drives the alarm means 31 in response to the resulting output of the voltmeter 22. The alarm means 31 reports the operator that the ink 11 remaining in the container 12 is short, and allows the operator to prepare for the replacement of the container 12.

Why the voltage induced in the sense coil 24 drops below the preselected value with the decrease in the amount of the ink 11 is as follows. When the ink 11 in the container 12 decreases below the preselected amount, the container or sack 102 deforms in the direction of folding and reduces the distance between the electrodes 18a and 18b. As a result, the capacitance of the electrodes 18a and 18b decreases and causes the resonance frequency of the resonance circuit 107 to shift to the high frequency side (see FIGS. 17 and 18).

Assume that the printer is continuously operated despite the drive of the alarm moans 31. Then: when the container 12 is about to run out of ink 11, the fuse 116 blows out with the result that the voltage induced i n the sense coil 24 immediately drops to zero, In response, the controller 29 causes the printer to stop operating. This successfully obviates defective printings, e.g., printings with blurred characters. Why the fuse 116 blows out when the container 102 is about to run out of ink 11 is that the frequency of the power source voltage is close to the frequency at which the resonance circuit 17 resonates, as stated earlier, and a current greater than the allowable current of the fuse 116 flows through the fuse 116.

Of course, the ink 11 in the first to fifth embodiments is only illustrative and may be replaced with any other desired liquid to be stored in a container and whose amount should be sensed, e.g., paint or cleaning liquid.

In the first to fourth embodiments, the resonance circuit, electrodes and low breakdown voltage capacitor are mounted on the inner periphery of the cardboard box. If desired, such structural elements may be mounted on the outer periphery of the cardboard box or an the inner periphery or the outer periphery of the sack. When the above structural elements are arranged on the inner periphery of the sack, their surfaces should be covered with waterproof sheets or waterproof films so as not to corrode due to contact with the ink or similar liquid While the resonance circuit, electrodes and fuse of the fifth embodiment are arranged on the outer periphery of the container or sack, they may be arranged on the inner periphery of the container. In such an alternative case, the surfaces of the above structural elements should also be covered with waterproof sheets or waterproof films for the purpose described above.

Further, the positions of the resonance circuit, electrodes and low breakdown voltage capacity or fuse shown and described are not limitative. The crux is that the positions be selected in accordance with the manner in which the liquid stored in the container decreases on the basis of, e.g., the configuration of the container and the suction characteristic of a suction pump.

Examples of the present invention will be described hereinafter.

EXAMPLE 1

The cardboard box 13 of the container 12 shown in FIG. 1 was sized 100 (length)×70 (width)×100 (height) mm. The electrodes 18a and 18b were respectively adhered to the lower portion of the side wall 13a and the lower surface of the bottomwall 13c. The first and second coils 21 and 22 and low breakdown capacitor 26 were adhered to the inner surface of the side wall 13b facing the sidewall 13a. The capacitor 26 is implemented by a chip capacitor having a capacitance of 10 pF. The electrodes 18a and 18b, coils 21 and 22 and capacitor 26 were electrically connected in the configuration shown in FIG. 2, forming the resonance circuit 17.

The electrodes 18a and 18b each had a rectangular shape sized 90 (length)×15 (width) mm. The coils 21 and 22 each had a square spiral configuration with the outermost dimension of 50 mm and had ten turns. The drive coil 23 and sense coil 24 each had a square spiral configuration sized 50 mm at each side and had five turns. The to drive coil 23 and sense coil 24 each were wound round a square plastic plate (acrylic plate) sized 50 mm at each side.

As shown in FIGS. 3 and 4, the sack 14 formed of vinyl chloride was received in the box 13 and stored 600 ml of ink 11. The drive coil 23 and sense coil 24 were located outside of the box 13 and faced the coils 21 and 22, respectively. The high frequency power source 27 was implemented by a function generator and a electrically connected to the drive coil 23.

EXAMPLE 2

Example 2 differs from Example 1 in that the high frequency power source is implemented by a drive power source 27, and in that the low breakdown voltage capacitor 26 was implemented by a pair of pieces of aluminum foil facing each other with the intermediately of a thin resin film. The capacitor 20 had a capacitance of 10 pF and a breakdown voltage of 50 V.

EXAMPLE 3

As shown in FIG. 9, the container or sack 102 had a rectangular parallelepiped configuration sized about 100 (length)×70 (width)×100 (height) mm and was implemented by a polyester file The electrodes 10*a* and 10*b*, coils 21 and 22 and fuse 116 each were produced by etching 30 μm thick aluminum foil adhered to a PET sheet not shown. The electrode 18*a* is adhered to the lower portion of the sidewall 102*b* such that the PET sheet covers it. Likewise, the electrode 18*b* is adhered to the lower surface of the bottom wall 102*c* such that the PET sheet covers it. Further, the coils 21 and 22 and fuse 116 were adhered to the lower surface of the bottom wall 102*c* such that the PET sheets cover then The electrodes 18*a*, 18*b*, coils 21 and 22 and fuse 116 were electrically connected in the configuration shown in FIG. 10, forming the resonance circuit 107.

The electrodes 18*a*, 18*b*, coils 21 and 22 and fuse 116 were configured in the same manner as in Example 1. Also, the drive coil 23 and sense coil 24 were configured in the same manner as in Example 1.

600 ml of ink 11 was stored in the container 102. The drive coil 23 and sense coil 24 were located outside of the container 102 in such a manner as to face the coils 21 and 22, respectively. The function generator or high frequency power source 27 was electrically connected to the drive coil 23.

EXAMPLE 4

As shown in FIGS. 9 and 10, Example 4 is identical with Example 3 except that the function generator playing the role of the high frequency power source 27 was replaced with a drive power source having a frequency of 11.5 MHz.

Test 1 and Evaluation

Figure 14:
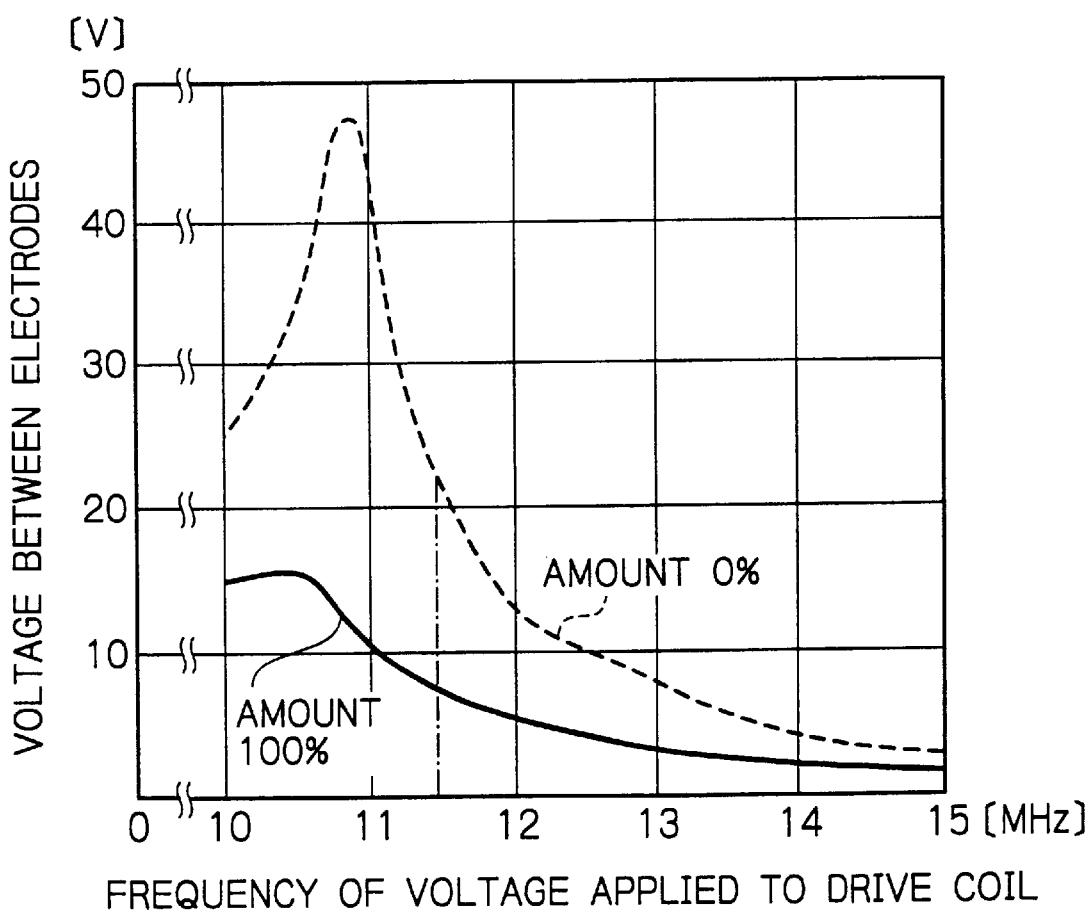
FIG. 14 is a graph showing a relation between the frequency of a voltage applied to a drive coil included in Example 1 and a voltage acting between a pair of electrodes.
Figure 15:
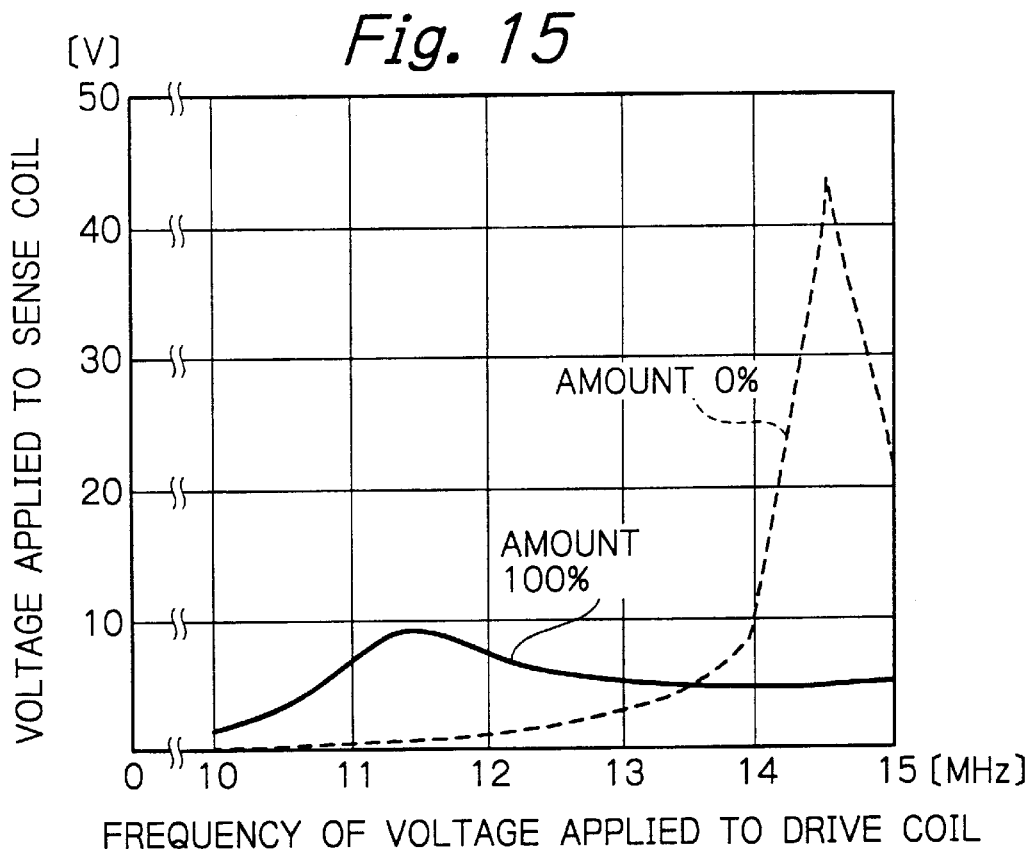
FIG. 15 is a graph similar to FIG. 14, showing a relation between the frequency of the voltage and a voltage acting on a sense coil.

In the above Example 1, a sinusoidal wave with the maximum voltage of 19 V and a frequency varying between 10 MHz and 15 MHz was applied to the drive coil 23. The resulting voltage between the electrodes 18*a* and 18*b* and the voltage applied to the sense coil 24 were measured by an oscillograph. FIGS. 14 and 15 show the results of measurement.

As FIG. 15 indicates, when a voltage with a frequency of 11.5 MHz was applied to the drive coil 23, a voltage of 9.8 V was induced in the sense coil 24 so long as the container 12 was full of ink (100%; solid curve). When the container 12 ran out of ink (0%; dotted curve), a voltage of 1 V was induced in the sense coil 24.

As FIG. 14 indicates, the voltage of 11.5 MHz applied to the drive coil 23 caused a voltage of 7 V to appear between the electrodes 18*a* and 18*b* when the container 12 was full (100%; solid curve). When the container 12 was emptied (0%; dotted curve), a voltage of 23 V mare than three times as high as the above voltage appeared between the electrodes 18*a* and 18*b*. It follows that if a capacitor having a low breakdown voltage, e.g., 120 V is connected in parallel to the electrodes 18*a* and 18*b*, it breaks down when the container 12 is about to run out of ink.

Test 2 and Evaluation

Figure 16:
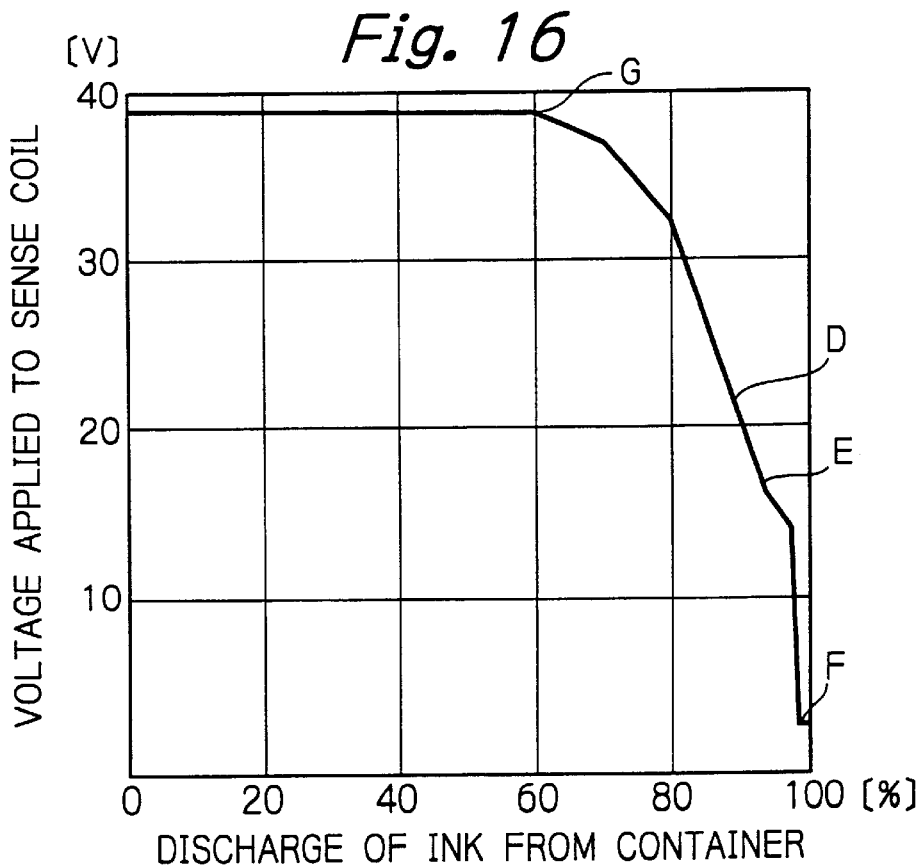
FIG. 16 is a graph showing a relation between the amount of ink discharged from the container and the voltage acting on the sense coil and particular to Example 2.

In Example 2, while in was continuously discharged from the container 12 at a constant flow rate, the voltage induced in the sense coil 24 was measured. In this case, a sinusoidal wave with a voltage having the maximum value of 76 V and a frequency of 11.5 MHz was applied to the drive coil 23. FIG. 16 shows the results of measurement.

As shown in FIG 16, when more than 40% of ink existed in the container 12, a voltage of 38 V was induced in the sense coil 24. When more than 60% of ink was discharged (point G, FIG. 16), the above voltage started dropping little by little. The above voltage dropped to about 22 V when about 90% of ink was discharged point D) and further dropped to about 16 V when about 95% of ink was discharged (point E). The low breakdown voltage capacitor broke down when about 99% of ink was discharged. At this instant, the voltage induced in the sense coil 24 sharply dropped to about 2 V (point F).

It will therefore be seen that Example 2 should only alert the operator to the near-end condition of ink when the voltage induced in the sense coil 24 drops below 16 V, and stop the operation of the printer when the above voltage drops below 4 V, determining that the container 12 has almost run out of ink.

Assume that the lamp of the alarm means is implemented by a character display or similar display mounted on the operation panel, as stated earlier. Then, the printer can inform the operator of the discharge of the ink from 60% (38 V at the point G, FIG. 16) to about 95% (16 V at the point E, as needed.

Test 3 and Evaluation

Figure 17:
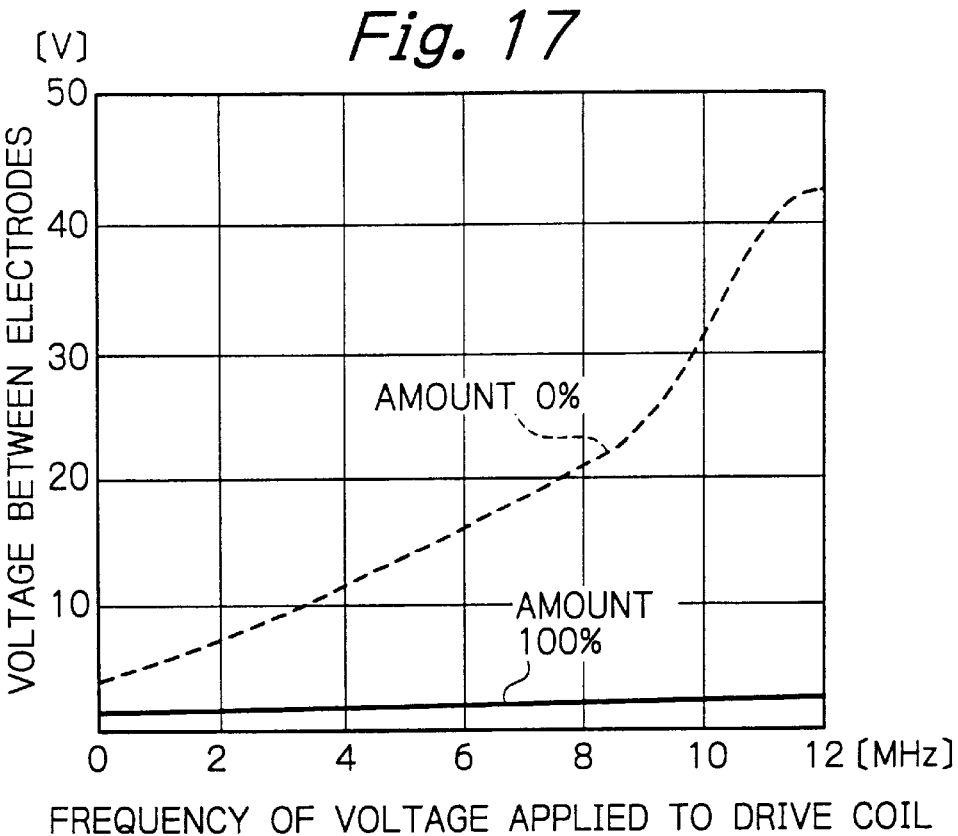
FIG. 17 is a graph showing a relation between the frequency of the voltage applied to the drive coil and the voltage acting between the electrodes and particular to Example 3.
Figure 18:
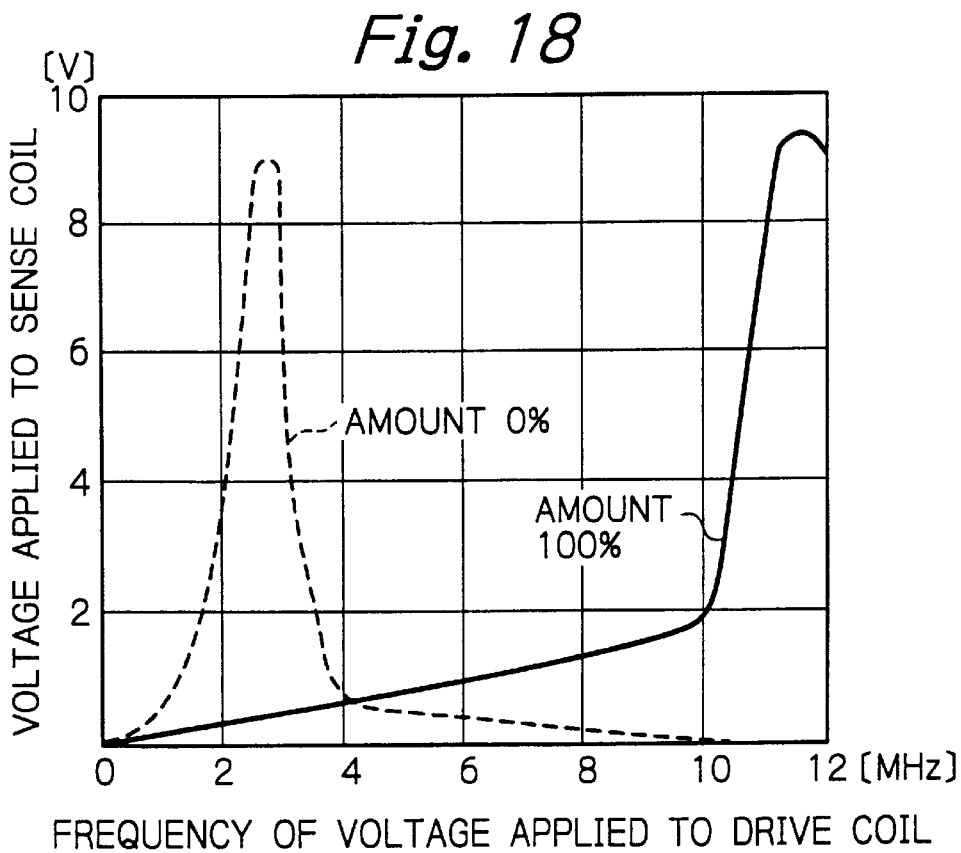
FIG. 18 is a graph showing a relation between the frequency of the voltage and a voltage acting on the sense coil and particular to Example 3.

In Example 3, a sinusoidal wave with the maximum voltage of 19 V and a frequency varying between 1 MHz and 12 MHz was applied to the drive coil 23. The resulting voltage between the electrodes 18*a* and 18*b* and the voltage applied to the sense coil 24 were measured by an oscillograph. FIGS. 17 and 18 show the results of measurement.

As FIG. 18 indicates, when a voltage with a frequency of 11.5 MHz was applied to the drive coil 23, a voltage of 9.3 V was induced in the sense coil 24 so long as the container 102 was full of ink (100%; solid curve). When the container 102 ran out of ink (0%; dotted curve), the voltage induced in the sense coil 24 was almost zero, As FIG. 17 indicates, the voltage of 11.5 MHz applied to the drive coil 23 caused a voltage of 3 V to appear between the electrodes 18*a* and 18*b* when the container 102 was full (100%; solid curve). When the container 12 was emptied (0%; dotted curve), a voltage of 43 V more than fourteen times as high as the above voltage appeared between the electrodes 18*a* and 18*b*. It follows that if a fuse blowing out when a current of, e.g., 0.5 A flows therethrough is serially connected to the electrodes 18*a* and 18*b*, it blows up when the container 102 is about to run out of ink.

Test 4 and Evaluation

In Example 4, while ink was continuously discharged from the container 102 at a constant flow rate, the voltage induced in the sense coil 24 was measured. In this case, a sinusoidal wave with a voltage having the maximum value of 76 V and a frequency of 11.5 MHz was applied to the drive coil 23. FIG. 19 shows the results of measurement.

As shown in FIG. 18, when more than 40% of ink existed in the container 12, a voltage higher than 30 V was induced in the sense coil 24, When more than 70% of ink was discharged (point G. FIG. 19), the above voltage started sharply dropping. The above voltage dropped to about 19 V when about 85% of ink was discharged point D) and further dropped to about 11 V when about 92% of ink was discharged (Point E). The fuse 116 blew out when about 99% of ink was discharged. At this instant, the voltage induced in the sense coil 24 was about 3 V (point F) and immediately dropped to about 0 V.

It will therefore be seen that Example 4 should only alert the operator to the near-end condition of ink when the voltage induced in the sense coil 24 drops below 14 V, and stop the operation of the printer when the above voltage drops below 8 V, determining that the container 102 has almost run out of ink.

Again, assume that the lamp of the alarm means is implemented by a character display or similar display mounted on the operation panel. Then, the printer can inform the operator of the discharge of the ink from 70% (29 V at the point G, FIG. 19) to about 95% (11 V at the point E), as needed.

The advantages achievable with the low breakdown voltage capacitor connected in parallel to the pair of electrodes or with the fuse serially connected to the same are as follows.

If the above capacitor or the fuse is absence, then the following two problems are given rise to. First, assume that the operator leaves the container with little ink remaining therein on the printer and causes the printer to start operating. In this condition, the small amount of ink on the inner periphery of the sack of the box has flown down to the bottom of the sack little by little and has formed a small pool on the bottom. The controller therefore determines that ink is present in the sack and renders the printer operable although driving the alarm means. As a result, as soon as the operator starts the printer despite the small amount of ink available in the sack, the controller determines that the container has run out of ink and immediately stops the operation of the printer. The operator is not urged to prepare a new container till then. This is undesirable from the efficient work standpoint.

Second, it is generally difficult to accurately determine that the container has fully run out of ink. Usually, therefore, the empty condition of the container is detected when some ink is still available in the container. The operator aware of such a common practice tries to produce as many printings as possible, i.e., to continue printing by shaking or tapping the container. When this is repeated, an ink roller disposed in the print drum and the inner periphery of the print drum repeatedly contact each other with little ink existing therebetween and therefore wear soon. At last, the print drum that is expensive is damaged.

An advantage achievable with the capacitor or the fuse unique to the illustrative embodiments is that not only the amount of remaining ink can be sensed, but also the capacitor breaks down or the fuse blows out when the container is about to run out of ink, insuring the detection of the absence of ink, as proved by Tests 1–4. Further, even when the printer is left unused with the container with no ink mounted thereto, the printer can surely inform the operator of the absence of ink. This allows the operator to see the need for the replacement of the container before actually operating the printer. That is, the operator can operate the printer after preparing a new container full of ink. This is successful to promote efficient work, reliable detection, and easy handling of the container.

Another advantage is that the capacitor or the fuse prevents the operator from forcibly using the printer by being caused to break down or blow out. The print drum that is expensive is therefore free from damage and has its life extended. increasing the number of printings available with the printer.

In summary, it will be seen that the present invention provides various unprecedented advantages, as enumerated below.

(1) When more than a preselected amount of liquid 11 is available in the container 12, a voltage induced in the sense coil 24 remains above a preselected value. The voltage drops below the preselected value when the liquid 11 in the container 12 decreases below the preselected amount. The amount of liquid 11 in the container 12 can therefore be determined on the basis of the variation of the above voltage.

(2) The voltage having the preselected frequency and applied to the drive coil 23 induces a voltage of preselected frequency in the first coil 21. As a result, a current of preselected frequency flows through the resonance circuit 17 and applies a voltage of preselected frequency to the second coil 22. This voltage applied to the coil 22 induces a voltage of preselected frequency in the sense coil 24. The voltage induced in the sense coil 24 is measured to determine the amount of liquid 11 left in the container 12. This also achieves the above advantage (1).

(3) When the container 12 is about to run out of liquid 11, the low breakdown voltage capacitor 26 breaks down due to a voltage higher than preselected one or the fuse 116 blows out due to a current greater than preselected one. As a result, the voltage induced in the sense coil 24 sharply decreases, surely indicating that the liquid 11 is absent in the container 12. In addition, only if the printer or similar apparatus using the liquid 11 is caused to stop operating in response to such a drop of the voltage, defective products are obviated.

(4) So long as more than a preselected amount of liquid 11 is left in the container 12, the alarm means 31 is not driven because the voltage induced in the sense coil 24 is lower than preselected one. The alarm means 31 is driven when the liquid 11 decreases below the preselected amount, i.e., when the voltage induced in the sense coil 24 drops below the preselected voltage. This surely shows the operator that only a small amount of liquid 11 is left in the container 12.

Various modifications will become possible for those skilled in the art after receiving the teachings of the present disclosure without departing from the scope thereof.

What is claimed is:

1. A method of determining an amount of a liquid existing in a container, comprising the steps of:

integrally forming a resonance circuit including a first coil, a second coil, and a plurality of electrodes on at least one side of the container;

providing a drive coil and a sense coil outside of the container;

applying a voltage having a preselected frequency to the drive coil to induce a voltage having a preselected frequency in said first coil of said resonance circuit;

inducing, based on the voltage induced in said resonance circuit, a voltage having a preselected frequency in said sense coil from said second coil;

measuring the voltage induced in said sense coil; and comparing the voltage induced in said sense coil and a preselected voltage value to determine an amount of a liquid in the container.

2. A device for determining an amount of a liquid existing in a container, comprising:

a resonance circuit integrally formed on at least one side of the container and including a first coil, a second coil and a plurality of electrodes;

a drive coil provided outside of the container and positioned to induce a voltage having a preselected frequency in said first coil;

a sense coil provided outside of the container and positioned to induce a voltage from said second coil;

a measuring device configured to measure the voltage induced in said sense coil; and a controller configured to compare the voltage measured by said measuring device with a preselected voltage value and determine an amount of a liquid in the container.

3. A device as claimed in claim 2, further comprising one of a plurality of water proof sheets and films covering said plurality of electrodes, respectively, wherein said plurality of electrodes is formed on an inner surface of the at least one side of the container.

4. A device as claimed in claim 2, wherein said resonance circuit comprises a metal etched onto the container.

5. A device as claimed in claim 4, wherein said metal comprises one of aluminum and copper.

6. A device as claimed in claim 2, wherein said resonance circuit further includes, a fuse serially connected to said plurality of electrodes and configured to blow out when a current greater than a preselected current flow therethrough.

7. A device as claimed in claim 2, further comprising a moisture proof layer covering a plurality of outer surfaces of the container.

8. A device as claimed in claim 2, wherein said resonance circuit further includes a low breakdown voltage capacitor connected in parallel to said plurality of electrodes and configured to break down when a voltage above a preselected value is applied thereto such that the voltage being induced in the sense coil drops at least to the preselected voltage value.

9. A device as claimed in claim 2, further comprising alarm means for producing an alarm when a voltage sensed by said sense coil drops below a preselected voltage.

10. A device as claimed in claim 2, wherein the liquid comprises ink for use in a printer.

11. A method as claimed in claim 1, wherein said forming step comprises forming said plurality of electrodes on at least one of an outer side surface and an outer bottom surface of the container.

12. A method as claimed in claim 1, further comprising covering said plurality of electrodes with at least one of a plurality of water proof sheets and films, wherein said forming step comprises forming said plurality of electrodes on at least one of an inner side surface and an inner bottom surface of the container.

13. A method as claimed in claim 12, wherein said at least one of a plurality of water proof sheets and films comprises one of polyethylene and polyester.

14. A method as claimed in claim 12, wherein said at least one of a plurality of water proof sheets and films each comprises one of a single polyethylene film, a single polyester film, a laminate polyethylene film and a laminate polyester film.

15. A method as claimed in claim 1, wherein said forming step comprises etching a metal into said resonance circuit.

16. A method as claimed in claim 1, wherein said forming step comprises etching one of aluminum and copper into said resonance circuit.

17. A device as claimed in claim 3, wherein said at least one of a plurality of water proof sheets and films comprises one of polyethylene and polyester.

18. A device as claimed in claim 3, wherein said at least one of a plurality of water proof sheets and films each comprises one of a single polyethylene film, a single polyester film, a laminate polyethylene film and a laminate polyester film.

19. A device as claimed in claim 2, wherein said controller is configured to at least one of activate alarm means for alarming shortage of the fluid and shut down operation of an apparatus embodying the container based on a voltage induced in said sense coil.

20. A device for determining an amount of a liquid existing in a container, comprising:

probing means for electrically probing the amount of the liquid, said probing means being integrally formed on at least one side of the container and including a first coil and second coil;

a drive coil provided outside of the container and positioned to induce a voltage having a preselected frequency in said first coil; and a sense coil provided outside of the container and positioned to induce a voltage from said second coil;

measuring means for measuring the voltage induced in said sense coil; and determining means for determining an amount of a liquid in the container by comparing the voltage measured by said measuring device with a preselected voltage value.

* * * * *

UNITED STATES PATENT AND TRADEMARK OFFICE
CERTIFICATE OF CORRECTION

PATENT NO. : 6,474,156 B1
DATED : November 5, 2002
INVENTOR(S) : Takanori Endo et al.

It is certified that error appears in the above-identified patent and that said Letters Patent is hereby corrected as shown below:

Column 1,
Line 31, change "," to -- . -- after "signal";
Line 37, insert -- . -- after "section";
Line 48, insert -- . -- after "gate";
Line 48, change "when" to -- When --.

Column 2,
Line 8, change "8-56" to -- 6-56 --.

Column 3,
Line 25, change "tho" to -- the --.

Column 4,
Line 1, change "," to -- . -- after "respectively";
Line 29, change "12$b$" to -- 18$b$ --;
Line 31, change "28" to -- 26 --;
Line 64, change "coal" to -- coil --.

Column 5,
Line 52, change "28" to -- 26 --;
Line 58, change "describe" to -- described --.

Column 6,
Line 23, change "68" to -- 88 --;
Line 47, change "702$c$" to -- 102$c$ --.

Column 7,
Line 10, change "It" to -- it --;
Line 22, change "108" to -- 106 --;
Line 47, change "22" to -- 28 --;
Line 47, after "reports" insert -- to --;
Line 64, change "," to -- . -- after "zero".

Column 9,
Line 4, change "20" to -- 26 --;
Line 11, change "10$a$" to -- 18$a$ --;
Line 11, change "10$b$" to -- 18$b$ --;
Line 58, change "mare" to -- more --;
Line 61, change "120 V" to -- 20 V --;

UNITED STATES PATENT AND TRADEMARK OFFICE
CERTIFICATE OF CORRECTION

PATENT NO.    : 6,474,156 B1
DATED         : November 5, 2002
INVENTOR(S)   : Takanori Endo et al.

It is certified that error appears in the above-identified patent and that said Letters Patent is hereby corrected as shown below:

<u>Column 10,</u>
Line 28, insert -- ) -- after "E";
Line 62, change "18" to -- 16 --
Line 67, insert -- ( -- after "discharged"

<u>Column 11,</u>
Line 21, change "absence" to -- absent --

Signed and Sealed this

Twenty-second Day of April, 2003

JAMES E. ROGAN
*Director of the United States Patent and Trademark Office*